(12) United States Patent
Polo-Malouvier et al.

(10) Patent No.: US 8,046,673 B2
(45) Date of Patent: Oct. 25, 2011

(54) APPARATUS AND METHOD FOR FACILITATING TRUSTED BUSINESS INTELLIGENCE THROUGH DATA CONTEXT

(75) Inventors: Ricardo Polo-Malouvier, Levallois-Perret (FR); Sébastien Ducaule, Levallois-Perret (FR); Jean-Yves Cras, Paris (FR); Pierre Saurel, Puteaux (FR); Charles Arthur Piercey, Palo Alto, CA (US)

(73) Assignee: Business Objects Software Ltd., Dublin (IE)

( * ) Notice: Subject to any disclaimer, the term of this patent is extended or adjusted under 35 U.S.C. 154(b) by 1568 days.

(21) Appl. No.: 11/269,145

(22) Filed: Nov. 7, 2005

(65) Prior Publication Data
US 2007/0255574 A1 Nov. 1, 2007

(51) Int. Cl.
G06F 17/00 (2006.01)
(52) U.S. Cl. ...................................... 715/200
(58) Field of Classification Search .................. 715/200, 715/255
See application file for complete search history.

(56) References Cited

U.S. PATENT DOCUMENTS

| | | | | |
|---|---|---|---|---|
| 5,657,437 | A * | 8/1997 | Bishop et al. ................. | 715/203 |
| 5,740,429 | A * | 4/1998 | Wang et al. ............................ | 1/1 |
| 5,862,400 | A * | 1/1999 | Reed et al. ....................... | 712/34 |
| 6,317,758 | B1 * | 11/2001 | Madsen et al. ................. | 715/220 |
| 6,609,123 | B1 | 8/2003 | Cazemier et al. | |
| 6,831,668 | B2 * | 12/2004 | Cras et al. ....................... | 715/853 |
| 7,082,569 | B2 * | 7/2006 | Voshell .......................... | 715/212 |
| 7,356,779 | B2 * | 4/2008 | Cras et al. ....................... | 715/853 |
| 7,546,312 | B1 * | 6/2009 | Xu et al. ............................... | 1/1 |
| 2002/0023105 | A1 * | 2/2002 | Wisniewski .................. | 707/503 |
| 2002/0116665 | A1 * | 8/2002 | Pickover et al. ................. | 714/38 |
| 2002/0161799 | A1 * | 10/2002 | Maguire et al. ............... | 707/503 |
| 2004/0024739 | A1 | 2/2004 | Copperman et al. | |
| 2004/0117731 | A1 | 6/2004 | Blyashov | |
| 2004/0267740 | A1 | 12/2004 | Liu et al. | |
| 2005/0076003 | A1 | 4/2005 | DuBose et al. | |
| 2005/0144554 | A1 | 6/2005 | Salmon et al. | |
| 2005/0182709 | A1 * | 8/2005 | Belcsak et al. .................. | 705/38 |
| 2005/0234889 | A1 | 10/2005 | Fox et al. | |
| 2006/0003306 | A1 * | 1/2006 | McGinley et al. ............ | 434/350 |
| 2006/0069696 | A1 * | 3/2006 | Becker et al. .................. | 707/102 |
| 2006/0080594 | A1 * | 4/2006 | Chavoustie et al. .......... | 715/503 |
| 2006/0085444 | A1 * | 4/2006 | Sarawgi et al. ............... | 707/100 |
| 2006/0095832 | A1 * | 5/2006 | Serra et al. ..................... | 715/503 |
| 2006/0107196 | A1 * | 5/2006 | Thanu et al. ................... | 715/503 |
| 2006/0136407 | A1 | 6/2006 | Dettinger et al. | |
| 2006/0167860 | A1 | 7/2006 | Eliashberg et al. | |
| 2006/0195421 | A1 | 8/2006 | Wiest et al. | |
| 2006/0271841 | A1 * | 11/2006 | Thanu et al. ................... | 715/503 |
| 2006/0293982 | A1 * | 12/2006 | Hicks et al. ...................... | 705/35 |
| 2007/0038948 | A1 * | 2/2007 | Cornacchia, III ............. | 715/762 |
| 2007/0130503 | A1 * | 6/2007 | Voshell .......................... | 715/504 |
| 2007/0150862 | A1 * | 6/2007 | Naibo et al. ................... | 717/110 |
| 2008/0065471 | A1 * | 3/2008 | Reynolds et al. ............... | 705/10 |
| 2009/0055733 | A1 * | 2/2009 | Graeber ........................ | 715/271 |

OTHER PUBLICATIONS

Domeniconi et al., Subspace Clustering of High Dimensional Data, Google 2004, pp. 1-5.*
Tory et al. A Parallel Coordinates Styel Interface for Exploratory Volume Visualization, IEEE 2005, pp. 71-80.*
Klein et a., A Digital Filter bsed Generation of Inflow Data for Spacially Developping Direct Numerical or Large Eddy Simulations, Google 2003, pp. 652-665.*
Abraham et al., Goal-Directed Debugging of Spreadsheet, IEEE 2005, pp. 1-8.*

* cited by examiner

Primary Examiner — Cong-Lac Huynh
(74) Attorney, Agent, or Firm — Mintz, Levin, Cohn, Ferris, Glovsky and Popeo, P.C.

(57) ABSTRACT

A computer readable medium with executable instructions to analyze a report value, includes executable instructions to select a report value and identify the formula evaluated to produce the report value. Formal parameters associated with the formula are determined. The actual parameters used to compute the report value are located. The formula, the formal parameters and the actual parameters are then displayed.

12 Claims, 7 Drawing Sheets

| US |
| --- |

| Channel | Revenue |
| --- | --- |
| Direct | 257 |
| Indirect | 43 |

| US |
| --- |

| Channel | Population |
| --- | --- |
| Direct | 260 |
| Indirect | 260 |

| US |
| --- |

| Channel | Direct Revenue |
| --- | --- |
| Direct | 257 |
| Indirect | 257 |

Figure 7

| Expression E | P(E) |
| --- | --- |
| Measure (from the Universe) | Intersection of F and the list of Dimensions that govern this measure, as stated by the metadata attached to this measure |
| Dimension (from the Universe) | Intersection of F and this dimension (if this set is empty, an error value is displayed). |
| Detail (from the Universe) | Intersection of F and the Dimension that governs this detail, as stated in the associated piece of metadata (if this set is empty, an error value is displayed). |
| Scalar combination of sub-expressions Ei, e.g: E1 + E2 / E3 | Union P(Ei) for all i. |
| SubExpr Where Filter | P(SubExpr) minus the list of dimensions restricted in Filter. |
| SubExpr IN DimList | Intersection of P(SubExpr) and DimList |
| SubExpr ForEach DimensionList | P(SubExpr) evaluated in a local context where F is augmented with DimensionList. This expression is always embedded inside an aggregating function such as an average. |
| AggFunc( Expr ForEach DimensionList) AggFunc is an aggregation function such as an average, count or sum. | P(Expr). Outside of the aggregation function's scope, DimensionList is ignored. |
| SubExpr Forall DimList | P(SubExpr) minus DimList. |

Figure 8

| Expression E | D (E) |
|---|---|
| Measure (from the Universe) | Intersection of I and the list of Dimensions that govern this measure, as stated by the metadata attached to this measure |
| Dimension (from the Universe) | This dimension (it has necessarily been retrieved and must thus belong I). |
| Detail (from the Universe) | Intersection of I and the Dimension that governs this detail, as stated in the associated piece of metadata. |
| Scalar combination of sub-expressions Ei | Union D (Ei). |
| SubExpr Where Filter | D(SubExpr) |
| SubExpr IN DimensionList | D(SubExpr) |
| SubExpr ForEach DimensionList | D(SubExpr). This expression is always embedded inside a, aggregating function such as an average. |
| AggFunc( Expr ForEach DimensionList) AggFunc is an aggregation function such as an average, count or sum. | D(Expr). |
| SubExpr Forall DimList | D(SubExpr) |

Figure 9

APPARATUS AND METHOD FOR FACILITATING TRUSTED BUSINESS INTELLIGENCE THROUGH DATA CONTEXT

BRIEF DESCRIPTION OF THE INVENTION

This invention relates generally to data storage and retrieval. More particularly, this invention relates to techniques for evaluating the accuracy of business intelligence data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, and Business Objects Web Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like.

Complex ad-hoc reports can be built with the reporting model described in U.S. Pat. No. 6,831,668, which is incorporated by reference. Using data selected from a semantic layer, reports combine objects that represent data into "zones" of a hierarchy of reporting elements. Each zone implicitly defines a computation context for the data that it contains, based on the hierarchy of its containers and on local information such as the "axes" that govern it and the filters that apply to it. The inclusion of objects in report zones defines complex semantics for the data computed and visualized in the report. Moreover, beside the objects themselves, the user can also define complex report variables or formulas that combine objects together and can also explicitly define or override their computation contexts.

It is not obvious for a report user, even one that has good knowledge of the business semantics of the objects in the Semantic Layer, to really understand the semantics and meaning of report data as it appears in the final layout. Questions such as the following are not easy to answer using state-of-the-art products:

What is the exact definition of the piece of data I'm looking at?

If I'm looking at a value evaluated from a complex expression, what are the values of the sub-expressions used in the computation?

When I'm looking at a measure, does it depend on other dimensions than those shown on the report? If yes, what values have been chosen?

What filters have been applied to my report and did they impact the data I'm looking at?

If I'm looking at an error value, where does the error come from?

What is the original set of database data that led to this computation result?

Some products can display a formula attached to a cell in the structure of a report. However, this formula does not always clearly indicate which parameters influence the computation of the report value. In addition, the formula does not show the value of the actual parameters that were used to compute the precise value that the user is considering. Some products like Microsoft® Excel® provide an audit capability that helps users understand how a cell was computed from others. But this is limited to a framework where each individual cell can be addressed, regardless of the semantics of the data that it contains, and a cell that is defined as a combination of others uses this addressing system. In a complex Business Intelligence report, report values are defined in a declarative, self-sufficient way, that does not refer to other report values by their "address" but by their data semantics; even if the report is modified and the location of a report value changes, other report values that depend on it still preserve their semantics.

Some Business Intelligence products offer lineage capacities, hence the ability to understand what raw data was used to compute a report, but this applies to a report as a whole; users need to better understand the precise set of data that was used to compute an individual report value.

Other products offer "drill-down" capabilities, which allow a report viewer to get to the next level of detail underlying a computation. However, this capability is limited to navigating dimensions along different levels; it does not help users understand the contribution of various sub-formulas that contribute to the computation of a single value. Some Online Analytical Processing (OLAP) products offer advanced capabilities, but they have significant limitations, such as:

They only provide the requested information for data coming directly from a multidimensional database, not to values computed inside the report;

They only apply to simple reports, such as a unique OLAP grid.

In view of the shortcomings of the prior art, it would be desirable to provide trusted Business Intelligence in a natural and intuitive way, regardless of the complexity of the data universe and report. In particular, it would be desirable to provide functionality on top of complex reports that contain, for instance, multiple blocks synchronized under sections, and in general an arbitrary nesting of reporting elements combining data from an arbitrary number of data sources and locally computed data, as disclosed in U.S. Pat. No. 6,831,668. In addition, it would be desirable to provide a Business Intelligence technique to support debugging of a report, and in particular to understand why an error value has been computed or how the components of a complex expression contributed to a given value.

SUMMARY OF THE INVENTION

The invention includes a computer readable medium with executable instructions to analyze a report value. Executable instructions select a report value and identify the formula evaluated to produce the report value. Formal parameters associated with the formula are determined. The actual parameters used to compute the report value are located. The formula, the formal parameters and the actual parameters are then displayed.

The invention also includes executable instructions to produce a report with data from multiple data sources; nest report values in a report containment hierarchy; select a report value; determine dimensions used to establish the report value; and display dimension values.

The invention also includes executable instructions to produce a report with data from multiple data sources; nest report values in a report containment hierarchy; select a report value; identify the formula evaluated to produce the report value; determine an intermediate value for a sub-expression of the formula; and display the intermediate value.

Finally, the invention includes executable instructions to produce a report with data from multiple data sources; nest report values in a report containment hierarchy; select a report value; and identify dimensions associated with a measure corresponding to the report value, wherein the dimensions are not shown in the report.

The invention allows for the presentation of any report value as the result of the computation of some function for certain values of its arguments, thus improving the understanding of the report value's business meaning. The invention also provides a technique to show and analyze the intermediate results that contributed to the computation of a single report value from a complex formula involving different computation contexts, thus helping report authors debug and tune their reports. The invention also allows one to analyze the reasons why the computation of a report value delivered an error value, which also helps report authors debug reports. The invention facilitates the identification of items in the initial data set coming from the data source that have been involved in the computation of a report value, allowing users to trace report data down to its very origin. Thus, the invention provides a set of features which together improve the overall level of trust and understanding that report users will grant to the report and the data that it contains. Moreover, the invention provides for the aforementioned abilities not only inside a stand-alone report, but also in any non-report documents that contain report data, such as documents that embed query and reporting capabilities.

BRIEF DESCRIPTION OF THE FIGURES

The invention is more fully appreciated in connection with the following detailed description taken in conjunction with the accompanying drawings, in which:

FIG. 7 illustrates dependency between different measures processed in accordance with the invention.

FIG. 8 illustrates the set of parameters for an expression as generated in accordance with an embodiment of the invention.

FIG. 9 illustrates the set of dimensions involved in computing an expression processed in accordance with an embodiment of the invention.

Like reference numerals refer to corresponding parts throughout the several views of the drawings.

DETAILED DESCRIPTION OF THE INVENTION

Figure 1:
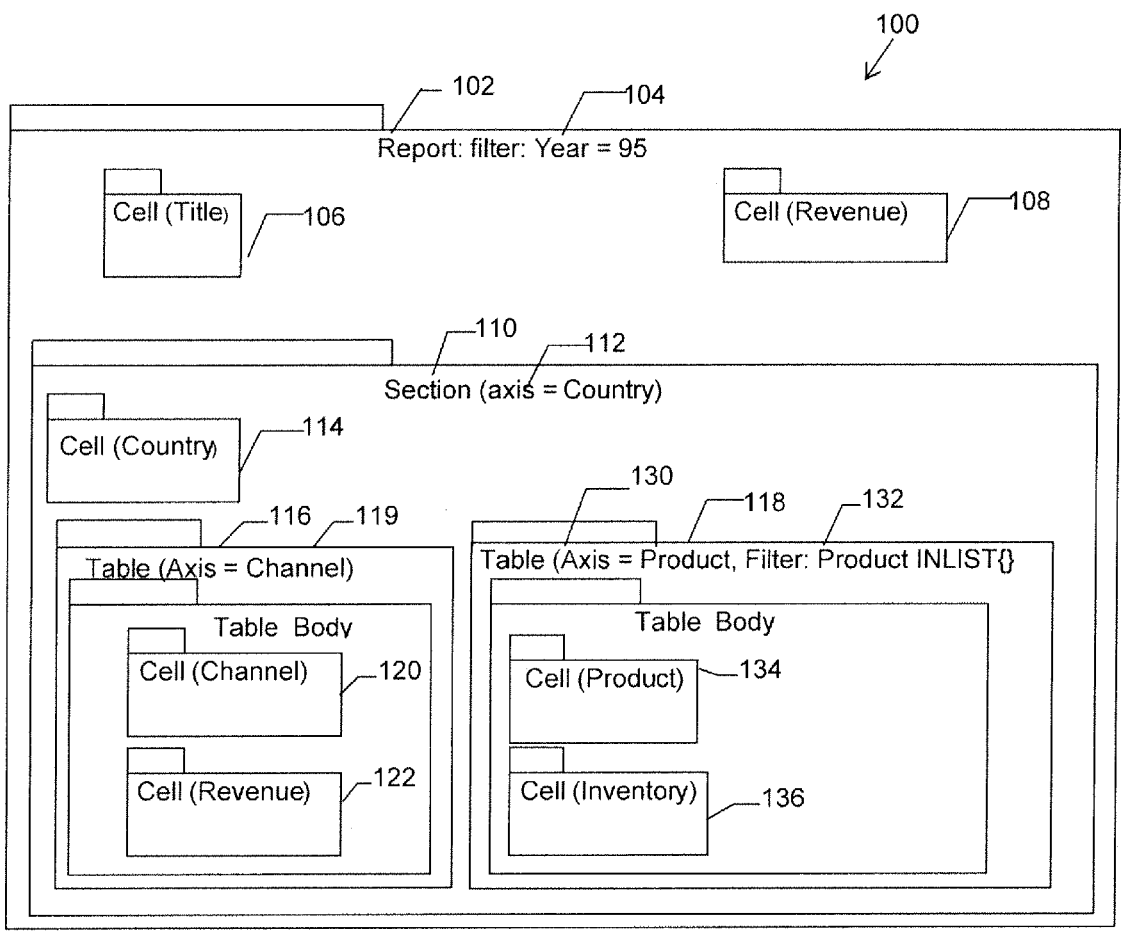
FIG. 1 illustrates an exemplary report specification that may be processed in accordance with an embodiment of the invention.

The invention may be implemented with the general reporting model disclosed in U.S. Pat. No. 6,831,668 (the '668 patent) entitled "Analytical Reporting on Top of a Multidimensional Data Model". The following discussion summarizes concepts from the '668 patent and expands on some of the dynamics of report computation.

Reports are built by inserting report data items and other formulas into a containment hierarchy of report elements, each structured in graphical zones that are governed by axes. Any value displayed in a report, or report value, belongs to a specific instance of a zone in a terminal reporting element, and is thus obtained by computing a formula in a dimensional context determined by one of the many combinations of values for each of the axes that govern this zone. Filters may also be assigned to the reporting elements.

Based on a declarative description of the report, called the Report Specification, a Computation plan is built and passed to a computation engine that performs the actual computation as needed by the users.

There are different report data items available to a report builder. Business Objects from a Universe constitute one type of report data item available to a report builder. Business Objects are abstractions of database or data source data into user-friendly business entities, such as described in U.S. Pat. No. 5,555,403. Among other properties, a Business Object has a friendly name and a qualification, such as a dimension.

A Dimension object models a set of business entities of a common nature such as a geographical location, a product or group of products, and a time period, that are used to structure an analysis. Dimension objects can have properties (attributes or details) attached to them. For instance, a Customer could have an address. Dimension objects can be structured into OLAP hierarchies. For instance, Countries contain States, which contain Cities. When a Dimension object is directly used in a report, what appears is not the business entity, but an attribute, such as a unique name or caption, designed to be user-friendly.

A Measure object models a quantity or variable item that usually takes its values as a function of a set of values for dimension objects. For instance, a Sales Revenue measure is a numerical value; there is a distinct value of this measure for each geographical location, each period of time, and each product or set of products. A measure is always associated with the group of dimensions on which it depends, called its dimensionality. For instance, the dimensionality of the measure Revenue is {Geography, Time, Product}, whereas the dimensionality of a measure "Population" might be {Geography, Time}—since populations of geographical entities vary with time but have nothing to do with products.

"Aggregating" a measure along one or several dimensions is the act of determining an overall value of this measure for sets of members of these dimensions. For instance, Revenue could be aggregated by cities or whole countries or by day or quarters. For each dimension that "governs" it, a measure may also specify how values are "aggregated" along the members of the dimension. For instance, it can be specified that the measure "Inventory" aggregates by a sum on Geography (the inventory for a given product in a country at a point in time is the sum of the inventories for all its cities) and on Product (the inventory for a group of products is the sum of inventories for each product in this group), but aggregates on "last" along the time dimension (the inventory for a product for the year is the inventory at the end of the last day of this year). A set of measures with same dimensionality can be grouped into a set, called a Dimension of Measures, that behaves just like a dimension. Together with the dimensions that define its dimensionality, a Dimension of Measures defines a Cube.

A Detail object models a non-dimensional attribute—often a string, but sometimes a numeral or a date—for a Dimension object. For instance, a Customer may have an Address. When a Business Object is inserted into a report Zone, a computation context can be defined for it. This context—formally defined hereafter—describes which filters are applied to dimensions and details and how measures have been aggregated.

A report builder may also use Complex formulas. A complex formula combines report data entities into a more compound entity. Formulas may be scalar—they relate two business entities that are in the same computational context. An object such as "Revenue—Cost", where both measures Revenue and Cost have the same dimensionality, is a scalar formula. Its computational context (as defined hereafter) is implicitly the (common) computational context of both sub-formulas and is entirely determined by the place in the report (which report element, and which zone thereof) where the formula is being inserted.

Another type of formula is a contextual formula. More complex objects, such as a ratio: "Revenue/Revenue For All Countries" are "contextual" in that they explicitly define the computational context for some of their components. In this example, the denominator in the fraction is required to be aggregated for all countries, even if the computational context of the formula as a whole may specify individual countries instead.

Some formulas explicitly describe their context or part of it. For instance, "Revenue where Year=1995" explicitly mentions that only that year can be used to compute the Revenue, even if the containing report element indicates a different context by default. However, this formula sets no explicit condition about which Product, for instance, should be considered to determine the Revenue. This is left to the environment.

Additionally, a formula may refer not to a dimensional context but to a local context, relative to the place in the report where it comes from. For instance, a formula could specify the expression "Revenue/Revenue in Report". When such a formula is inserted into a Report, it is possible to derive its dimensional context from one of its containers. Constant expressions are also formulas.

A report builder may also utilize Report Variables. A Report variable is a named formula. It has the same appearance as a Business Object to users and it shares many of its characteristics—friendly name, qualification as a Dimension, Measure or other. However this piece of report data is actually defined as a formula. For instance, one could define "Growth" as "Revenue Where Year=2005/Revenue Where Year=2004", or "Margin" as "Revenue—Cost". Variables can be re-used across the report, but at each place where they appear, their computational context is exactly the one that would be associated to their defining formula if it had been inserted at that place.

Overall, the term "formula" is equated with Reporting Data—it happens that even when a single Business Object is used in a Report, a formula is wrapped around it. Note that the computation context for a formula depends on the formula itself, but also (in general) on the place where it appears in the report structure.

A Report Value is any single value that is being displayed in an actual report, as opposed to the formula that was used to compute or retrieve it. For instance, a report cell may contain the value "US", which happens to be the result of the computation of a formula "Country" in a certain context. Likewise, another cell—or a chart—might display the value "42", which happens to be the number of orders received in July 2003 for product Acme in the city of San Francisco; this value (maybe among others) was determined by evaluating a formula such as "NOrders". Any report value is computed from some formula, and most formulas inserted into reports result into several report values being displayed.

Report elements are described in the '668 patent. The structural elements in a report, such as sections, tables, charts, free cells, etc., are structured into a hierarchy of containment. Any report element is characterized by a number of "axes"—zero, one or more—and a number of zones—zero, one or more. A reporting element that has no zones is a terminal reporting element; a reporting element that has zones is called a container. For instance, a single cell has no axis and no zone; a vertical table has one axis and three zones (its header, body and footer); a chart usually has one or two axes and no zone; a cross-tab has two axes and up to 9 zones (its horizontal and vertical headers and footers); a section has one axis and two zones. Of this list, only the Cell and Chart are terminal reporting elements; the others are containers.

An axis contains a sequence of Business Objects or report Variables that are qualified as dimensions; the axis also contains indications about the order in which each dimension should be enumerated. For instance, one could define the axis "Country (alphabetical ascending), Product (database order)" for a table.

A zone represents a sub-area of the report element where other report elements can be inserted. A zone is attached to zero, one or more of the axes attached to the reporting element. When a zone is attached to an axis, the principle of report generation is that graphically, a new instance of the zone will be displayed for each valid combination of values for dimensions in the axis. If a zone is attached to two axes, it would likewise be repeated for instance horizontally for one of the axes and vertically for the other (there are no theoretical limitations to the number of axes attached to a reporting element). Each repetition of a report element is called an instance of this reporting element. The Report Output of a report is the collection of all instances of the report elements.

Axes are implicitly inherited from container to contained reporting element: if a zone in a container reporting element is repeated along an axis to which it is attached, then any reporting element included in this zone will also be repeated accordingly. The contained reporting element may itself contain its zones that will additionally be repeated along their own axes. A container reporting element may also specify a filtering expression. This filtering expression is an arbitrary Boolean formula that limits either directly or indirectly the set of acceptable combinations of values for dimensions in the axes, specifies on which values to aggregate measures for dimensions that govern them and are not part of any axis, and/or limits the values of measures or details that should be displayed for each acceptable combination of dimension values.

Terminal reporting elements—cells and charts in the example below—are those to which individual pieces of report data are associated. Report Values are always displayed in some instance of a terminal report element.

Building a report equates to building a hierarchy of nested containers and terminal report elements, specifying the axes and filters of the containers (usually the association of zones to axes is predetermined), and adding pieces of report data (Business Objects, formulas) to the terminal elements. The determination of axes for a reporting element may be automatically performed depending on which dimension formulas are associated to certain of its zones ("header"); it is also possible to let the user explicitly specify axes through a specific user interface mechanism.

Attention now turns to the process of transforming a report specification to a computation plan. After a report has been specified, its description can be stored in a declarative form called a report specification. For instance, the report specification may be a set of XML documents.

FIG. 1 is a graphical representation of a sample report specification 100. The report's intent is to provide various levels of aggregation for data about sales and inventory in each Country for a given Year (1995). Sales Revenue data is initially available per country, channel, shop (a subdivision of Channel) and year; Inventory data is available per country, product and year.

The outmost Reporting element is the Report 102 itself. It has no axis, but it does have a filter 104 (Year=95). Its unique zone contains two cells: one for the title of the report (a constant string) 106 and one that contains the fully aggregated measure Revenue 108.

The report also contains another non-terminal reporting element, a section 110. The section 110 has an axis (Country) 112 and a zone, which in turn contains three reporting elements: a cell with the (current) Country 114, and two tables 116 and 118.

The first Table element 116 has one axis that contains the single dimension Channel 119; it has several zones but only one (the Body) is repeated along its axis. This table's body contains two cells—one for the name of the current channel 120 and one for the associated revenue 122.

The second Table element 118 has one axis 130 which consists of the Product dimension, and a table filter 132. The table body contains two cells—one for the current Product 134 and one with the associated Inventory value 136.

All constant report items have been suppressed for simplification. Normally, each Table header would by default contain a cell with the name of each dimension on the table's axis.

In accordance with the invention, the Report Specification is used to generate a computation plan, which will be used to perform the actual computations. A computation plan can be seen as a network of nodes where each node represents data in a certain computation context. These nodes are related by edges that represent transforms from one context to the next. The resulting graph is a Directed Acyclic Graph.

Figure 1A:
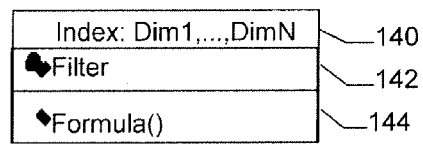
FIG. 1A illustrates a computation context that may be utilized in accordance with an embodiment of the invention.

A computation context is the association of a set of formulas, an index, which is an ordered list of dimensions with sort information for each, and a filtering expression. A computation context can be seen as a small multi-dimensional Cube that contains one value per formula for each combination of values for its index that comply with the filtering expression. It can also be seen as a row-set, from which it is possible to retrieve individual rows or partial row-sets by specifying individual indices or index ranges. FIG. 1A illustrates a computation context with an index 140, a filter 142, and a formula 144.

The root nodes in a computation plan, also called "initial nodes", map to the data source data that is made available to the reporting tool from the data source queries. One such node exists for each independent flow of data retrieved by the data source. For each initial node, the formulas contain one Business Object for each measure or detail retrieved from this flow of data (if a detail is retrieved without its governing dimension, it is handled as a Dimension). In this example, the filtering expression 142 is void. The index 140 contains all dimensions found in the flow. This initial node can be obtained from an arbitrary row set coming from a database by first sorting and projecting the flow along the dimensions that it contains; some data sources also retrieve such indexed flows directly.

Figure 2:
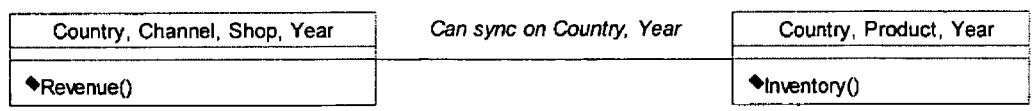
FIG. 2 illustrates initial nodes for a sample report processed in accordance with an embodiment of the invention.

FIG. 2 is a graphical representation of initial nodes that could be retrieved by a Business objects Query on a database with two fact tables underlying the sample report. Two SQL statements are generated and two flows of data are retrieved. The system recognizes that some of the columns in the retrieved flows refer to the same entity and can be further synchronized.

The leave nodes in a computation plan, also called "final nodes", map to the computation contexts actually requested by the Report. Based on the report specification, one can build these nodes by scanning each zone of each report element, and creating a computation context that contains:

one formula for each formula in the zone;

an index that is the combination of all dimensions in axes governing this zone and its ancestors;

a filter that is the combination of all filters associated with the zone's report elements.

Report semantics dictate that if two report zones have a common report element as an ancestor, then the matching final contexts should be synchronized along the set of dimensions in the index of the common ancestor. In other words, the index of a reporting element's context acts as an index for each of the contexts that map its contained report elements.

Figure 3:
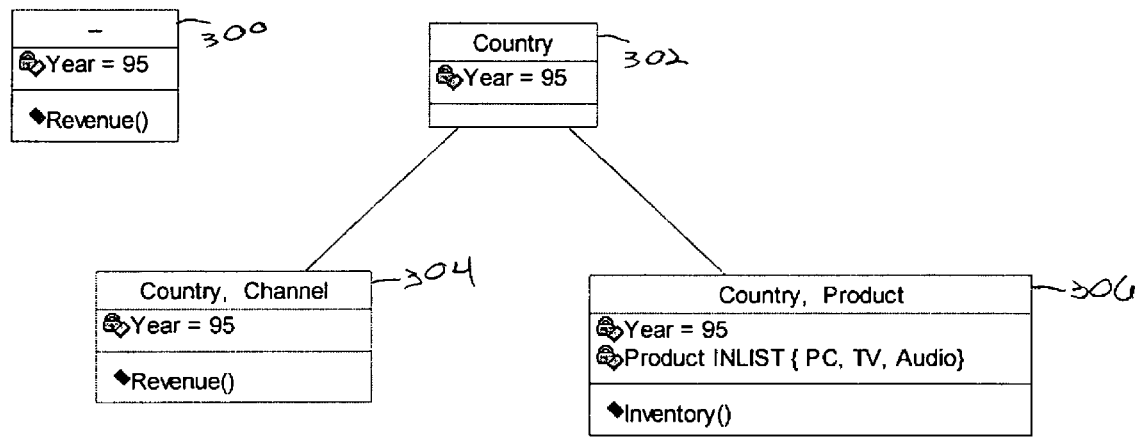
FIG. 3 illustrates final nodes for a report computation plan processed in accordance with an embodiment of the invention.

FIG. 3 is a representation of the final contexts requested to build the report of FIG. 1. We need one context for the cell 300 that contains the fully aggregated Revenue, one for the "Country" cell 302 in the Section, and one for the cells 304, 306 in each of the tables in the latter. The containment relationship between the section's context and the table's context is also depicted in FIG. 3.

Based on a set of initial and final nodes, it is then possible to build the computation plan. This may be done in any number of ways. Regardless of the implementation, the principle is to create intermediate computation contexts as required, so that one can navigate from one node to the next through a number of transforms, including, for example, a filter transform, a sort transform, a projection transform, a merger transform and a synchronization transform.

For a filter transform, the target computation context is produced from a source computation context by adding a filter expression to it. In multi-dimensional terms, this transform removes some point from a Cube without changing its dimensionality.

For a sort transform, the axis of a computation context is modified by a sort specification for one or several of its dimensions. In multidimensional terms, this transform changes the order of co-ordinates in a Cube.

With a projection transform, the transform modifies the index of a computation context. In multidimensional terms, this changes the dimensionality of a Cube. Normally, Projection removes one or more dimensions from the index and all measures are aggregated along the removed dimension using an aggregation operator specified by the measure object. This allows one to move from a detailed context to a more aggregated context.

A merge transform computes the union of two contexts that have the same index. Any valid combination of values for the index of either of the source contexts is a valid combination of values for the index of the target context. The target context contains all formulas from the source contexts. In multidimensional terms, this computes the union of several Cubes of the same dimensionality.

Synchronization is not a transform per se but a link between two computation contexts. The effect of this link is that the common parts of the index of both computation contexts are synchronized, so that any determination of a combination of coordinates for the common part of the context's index is propagated to the other index. In multidimensional terms, this can be seen as synchronizing two cubes along one or more common dimensions.

One particular usage of synchronization is to express a dependency between two contexts. This term describes the situation in which, in order to get evaluated, a context requires some formulas from another context with less dimensions. From any index value for the first context one can extract an index value for the second one, and retrieve the corresponding value of the requested formula. In multi-dimensional terms, this case corresponds to the introduction of degenerated values in a cube by augmenting its dimensionality. In one embodiment, synchronization is itself actually performed by a sequence of more elementary transforms and auxiliary contexts. In particular, both synchronized contexts are projected on a common set of synchronized dimensions and the indices computed for this common set are re-injected as new columns in the two initial contexts.

The general policy adopted by one embodiment of the invention is to generate a computation plan that states that filters should be applied as early as possible on top of the initial nodes, so as to avoid useless processing.

Figures 4, 5, 6:
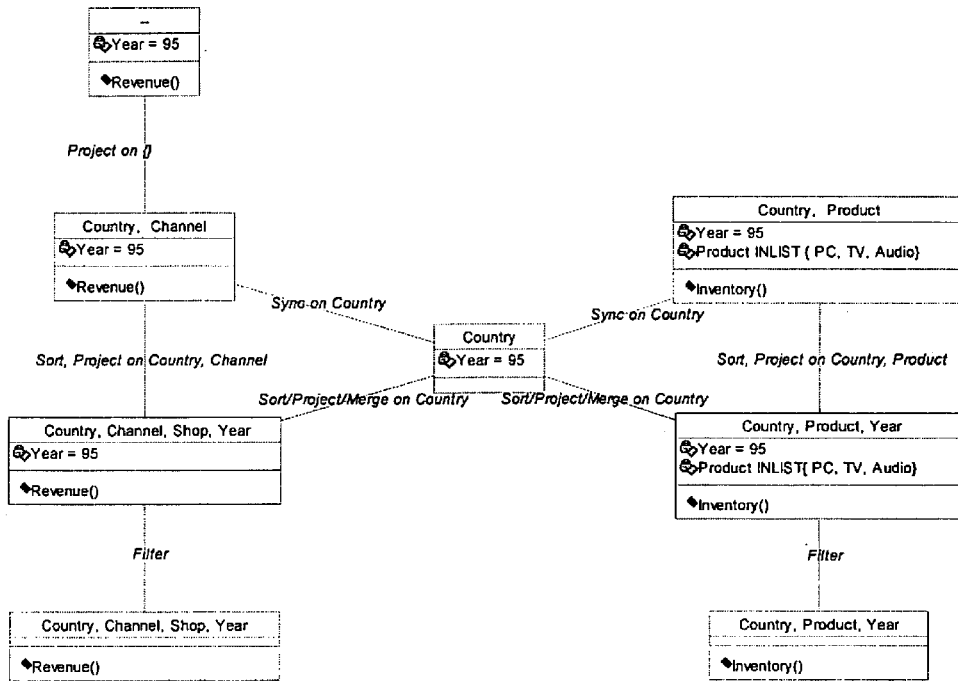
FIG. 4 illustrates a computation plan for a report processed in accordance with an embodiment of the invention.
FIG. 5 illustrates a measure evaluated in the context of its containing elements in accordance with an embodiment of the invention.
FIG. 6 illustrates a lack of dependency between different measures processed in accordance with the invention.

FIG. 4 illustrates a possible computation plan for a report based on the report specification of FIG. 1 and the initial nodes of FIG. 2 (some transforms are aggregated in order to increase legibility). The initial flows are first filtered on the Year dimension, which is common to both. The resulting contexts are used to obtain a context for Countries, to be used by the section, and that merges all values for Country obtained from each of the two filtered initial contexts. Each of the filtered initial contexts is also projected on the dimensions used in each table's axis. The resulting contexts are synchronized along their common dimension, Country, so that both Tables are computed in the context of their common ancestor, the section on Country. Last, a final projection eliminates all dimensions on Country and Channel, which delivers a context for the fully aggregated Revenue.

When a user wants to view a report or part of it, the computation plan is passed to a computation engine. The latter also receives requests from the Report Engine to return values matching different zones in the report elements. As values are requested for the formulas in a zone, the different combinations of values for the dimensions in its axes are determined; for each a new "instance" of the graphical zone is created and a value is determined for it according to the computation plan.

In one embodiment, this computation is performed in lazy evaluation mode. Each time a new value is requested for a formula in a computation context, this results in further requests being sent to the parent nodes in the computation plan. For instance, when the report engine requests a new value for Country in the section on Countries, the corresponding computation context is asked for a new single value.

In order to compute a single index value of a child computation context, it may be necessary to retrieve a full range of indexes from parent computation contexts. For instance, when a new Country is requested, it is necessary to retrieve a full range of indices in the two parent computation contexts that have several dimensions in their indexes, until a new Country is found. If a measure were to be aggregated over each Country, this would be achieved by aggregating all individual values of this measure on the previously mentioned range.

This consumption of indices propagates down to the initial nodes. Those can return their atomic values which are further aggregated or filtered by the callers, until the final report value is returned to the requesting final node.

The described embodiment of the invention is based on a stand-alone reporting product such as Web Intelligence™ from Business Objects Americas, San Jose, Calif. However, the invention can also provide value to any product that embeds this reporting technology. There are a number of technologies available for doing so. One is to embed the reporting engine into an existing product such as Microsoft® Excel® as an add-in. Another is to allow a third-party product to communicate with the report engine through web services. Those are well known technologies and several commercial solutions implement them. Because the invention does not set any specific requirement about the precise UI front-end that is presented to the user, but only specifies what information is to be exchanged between it and the reporting engine and how the latter must react, the invention can naturally be applied to provide its capabilities in such situations.

Any report value is determined by computing a certain (potentially complex) mathematical function of some parameters, for some actual values of these parameters that are determined by the instance's environment. Moreover, the function may use certain dimension values other than the actual parameters passed to it to compute itself, and it may be composed of different sub-formulas, each computed in its own context. Last, the function is always determined from combined data that ultimately comes from the data source.

The following description highlights the four elements of semantics that can be identified for a given report value, say 257:

What is being computed—i.e, the formula definition.

This value (257) is Net Sales Revenue per Country and Channel. Where is it computed—what actual parameters have been passed to the formula to get this specific value.

This value (257) is Net Sales Revenue for Country US and Channel Direct Sales. How is it computed—what other dimensional values have been used to compute or aggregate measures when computing the value. This includes any filter that may have been applied to the block or report, or even specified in the formula itself. This also includes sub-formulas that are being combined and that may each be evaluated in a different context.

This value (257) is Net Sales Revenue for Country US and Channel Direct Sales, for Year=95. It is being computed as Gross Revenue−Taxes in this context.

From what is it computed—what raw data has been involved in the computation.

This value (257) is Sales Revenue for Country US and Channel Direct Sales, for Year=95, It is being computed as Gross Revenue−Taxes in this context, based on the following data:

| Year | Channel | Shop | Country | Gross Sales | Taxes |
|---|---|---|---|---|---|
| 1995 | Direct Sales | Acme | US | 210 | 10 |
| 1995 | Direct Sales | Joe's | US | 39 | 2 |
| 1995 | Direct Sales | Ventura | US | 22 | 2 |

The next sections will expand on each of these components.

Any report value—a number, string or drawing—that is seen in a report is included in some instance of a terminal report element—i.e, a non-container reporting element, such as a cell or a chart in one implementation, but potentially a point on a map, etc. The report value has been computed from a formula that was originally attached to the reporting element that is considered in this instance.

It is thus easy to retrieve the formula used to compute any report value and such functionality does exist in mainstream reporting tools. However, the formula as entered by the user—or as deduced from user actions—may omit some implicit information. Specifically, it often does not mention explicitly which parameters can be passed to the formula—because the determination of actual parameters (dimension members) used to compute the formula is indeed automatic. But the knowledge of which dimensions can determine a formula is a key element of its semantics and users need to be informed even if the system does not need this information under an explicit form.

One can illustrate this point with an example. First, consider a snippet of the report described in FIG. 1, which is shown in FIG. 5. In mainstream reporting tools, it is possible to select the cell that contains the number 257 and to obtain a description of the formula used to compute it, for instance= [Revenue]. And some tools can give an explicit representation of its parameters: =[Revenue] IN {[Country],[Channel], [Year]}. Now, it is not always true that a formula depends on all the dimensions that appear in the same block or in container sections.

First of all, a measure may not depend on all the dimensions that appear in the same block or in containing sections. For instance, a measure such as Population may depend only on Country and Year, but not on Channel. If the report table above contains Population instead of Sales Revenue, then it must be clear that Channel is not a parameter for Population. In the context of this table, the explicit formula for Population must read: "=[Population] In ([Year], [Country]). This means that Channel is not relevant to this computation, as shown in FIG. 6.

Oppositely, a measure may depend on a dimension that does not belong to any axis of a containing report element. This is the case for "Year" in the sample report of FIG. 7. Because "Year" does not vary in the report—its values are fixed, Revenue should not be presented as if it were a function of variable "Year". Whatever else happens, Revenue has been computed aggregated on all authorized values of Year and no longer depends on it. The correct presentation for the "Revenue" formula would then be: [Revenue] In {[Country], [Channel]}

Also, a formula based on a measure may not use as a parameter all the dimensions on which this measure depends, even if these dimensions are actually enumerated in the same block or in containing sections. It may happen that the evaluated formula makes its evaluation context explicit and specifies values for some of the dimensions against which the measure will be evaluated. In this case, these dimensions are no longer considered as parameters; their actual values in the block or containing section are no longer relevant to the computation of the value.

For instance, the table above might contain a variable "Direct Revenue" that is defined by the formula "Revenue Where Channel='Direct'". In this case, Channel is not a parameter; its value is fixed. Only Country is a valid parameter for the function, as shown in FIG. 7.

As the examples above show, it is important to know exactly which of the dimensions have an influence on a measure. But the reporting tool cannot know of this with certainty unless it is provided with specific information about the dimensionality of a measure, for example in the form of metadata.

The invention specifies which dimensions must be identified as parameters for any formula in a way that takes into account the dimensionality of each measure as provided by a new metadata item associated with the measure.

The algorithm for this is recursive and explores the formula's sub-expressions. FIG. 8 illustrates how to build a list of parameters P(E) for an expression E, based on the type of the expression and on the value of P for its sub-expressions. We note F in the list of "final" dimensions that are used in all axes of the formula's containing Report Elements, and that appear in at least one final computation node of the computation plan. FIG. 8 should be read as a set of rules. If an expression E matches the template on the left, then the rule on the right must be applied; the rule may involve a recursive call that determines P for one or more sub-expressions of E, and it may otherwise use other sub-expressions. Where this happen, the sub-expressions are highlighted in bold.

Once the parameters for a dimension have been determined, the invention makes it possible for a user to understand which actual values for these parameters have been used to compute a given report value. This can be done in as follows. When a report is rendered and displayed, its output comes along with hidden metadata that relates each displayed report value with a specific identification of the element instance associated with this report value. This Report Value Identifier (RVI) specifies which report element is associated with the data and it specifies the unique ordinal for each axis that governs this report element that was used to compute this specific value. For instance, when rendering the cell "Revenue" with value 257 in the sample report, the report Engine will remember that this value was obtained for a certain cell in a certain table under the section (which, as a report element, has a unique identifier) and that it was computed for the first value of the table axis dimension Channel (say, the value Direct) and the second value of the section axis dimension Country (the value US). The Report Value identifier for this value might be encoded in a string or an XML snippet.

Later, when the user interacts with the report output, the Report Value Identifier can be sent back to the report engine, allowing the latter to specifically identify which of the instances of a report element—among the many generated for all values of its axes—is to be considered.

This information can then be used to identify which computation context was used to compute the value (using the unique identifier for its reporting element). Necessarily, all parameter dimensions for the formula are part of the index of this context. Using the Report Value identifier, one can retrieve the values from the index. For instance, since "257" is the value for Revenue obtained for the second Country and the first Channel, one can retrieve the values "US" and "Direct" for these dimensions. Thus, the invention can display the parameter values used to compute a report value in a specific area, such as a dedicated pane. However, it is also possible to highlight the parameter values at the places where they appear in the report itself. For this, a new type of alert is introduced. In traditional reporting, an alerter is a Boolean formula that is evaluated for each instance of a cell, which allows different formats to be used when rendering values for which the formula evaluates to True. We extend this notion with a new predicate "IsParameterOf(ReportValueID)". This predicate is evaluated for any cell as the report gets re-computed. If it holds, this means that the value that it contains is the caption of a dimension that is a parameter for the specified report value. It can then be highlighted.

Let V be a report value that has been selected by the user. In order to determine whether the predicate above holds for an arbitrary report value W—in other words, if W is the caption of one of the dimensions that are used as parameters for V's formula, first check if W's formula is exactly "=Dim" for one of the dimensions in P(W). Then check that the computation context for W's reporting element is a descendant of V's computation context in the computation plan.

Last, compute W's Report Value Identifier and compare it with V's report value identifier. Then check that the ordinal value for the common dimensions is the same. If all these conditions hold then the predicate returns True; otherwise False. As a result, the cells that display the actual parameter values for V can be highlighted inside the report itself. In the case of the sample report, one of the final computation contexts—that corresponds to the section cell—does compute the "Country" formula and is a descendant of the context that computes the table's Revenue formula. Likewise, the cell that displays Channels in the table is computed in the same computation context as Revenue for this table. It is thus possible to highlight the value "US" in the section for Countries, as well as the value "Direct" that lies in the same table instance as the selected value. Note that other instances of "Direct" that appear in difference table instance (e.g, under the section for "France") are not highlighted, because their report value identifiers don't carry the same ordinal value for both dimensions Country and Channel.

Consistent with the same principle, it is also possible to retrieve the set of values that was used for any dimension involved in the computation of a report value apart from its parameters. The difference with the previous case is that the computation plan is temporarily augmented so that additional information can be retrieved on all dimensions that were used in the formula computation without being parameters for this formula.

First one needs to identify these dimensions. FIG. 9 indicates, for any expression, the set of dimensions that are actually involved in computing it, including its parameters. "I" is the set of "initial" dimensions, i.e., those dimensions that have been actually retrieved by the report's initial queries and are present in some initial node of the computation plan. The intent and notation for this table is the same as in FIG. 8.

In order to determine the set of NP dimensions that are involved in the computation but are not parameters, one then subtracts the previously determined set of parameters from this one: NP(E)=D(E)−P(E).

Note that all contextual statements that modify the set of parameters for an expressions are irrelevant when it comes to evaluating the set of dimensions involved in the computation. Also note that for any expression E, P(E) is included in D(E). In the sample report, when selecting the value '257' for Revenue in the first table of the section NP([Revenue])={[Year]}.

Year is the only dimension that is used to compute Revenue and is not a parameter for it. Note that if the user had selected the fully aggregated value of Revenue that is retrieved in a free cell next to the report title, then no parameter would have been identified and NP would have been found equal to {[Country],[Channel],[Year]}. Now, let V be a selected report value obtained from an expression E. For each dimension D that was involved in the computation V but not used as a parameter for E, we want to display the set of distinct values for this dimension that have been actually used in the computation of V. The idea is very similar to what was done for parameters; the difference, though, is that we want to retrieve a set S of distinct values for each of these involved dimensions, which is usually not present in the report.

First, using the V's report value identifier, we identify the final computation context F that delivers this value. A unique value for the index of F can then be selected using the information in the report value identifier. The data is requested solely for this index value. This request propagates to the parents of this context and each returns a range of indexes for its own data that are needed to compute the requested value.

Among all the parent contexts that are used this way, at least one has the dimension D as part of its index and there exists one such context C that is computed after all filtering on D is completed. C iterates a set of values for D as the requested value for F is being computed.

Figure 10:
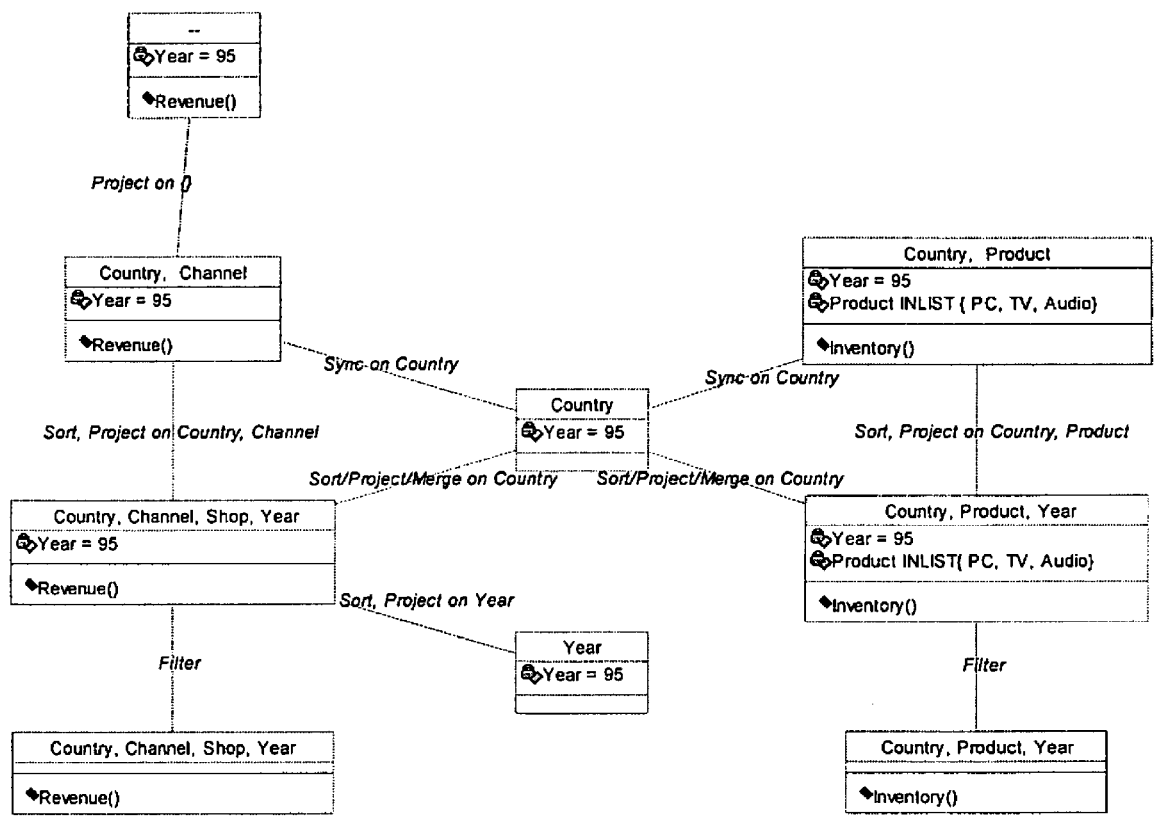
FIG. 10 illustrates a computation context utilized in accordance with an embodiment of the invention.

Last, in order to get only distinct values for D, a new on-the-fly computation context is added, which is obtained from C by sorting and projecting it on D. This new computation context retrieves the set S of all distinct values for D used during the evaluation of V. In the sample report, if the user has selected value 257 for Revenue in the first table under the section, then in order to identify which values for Year were involved in the computation, one can modify the computation plan as shown in FIG. 10. Because the temporary context inherits the filters previously applied on Year, the only value retrieved for Year is '95.

When a report value is based on a complex formula, the user may want to understand how each of these sub-formulas have been computed and how each contributes to the final result, even though its contribution is not initially visible in the report. For instance, imagine that a cell is added in the first table of the sample report, with the following expression: [Revenue]/([Revenue] Forall Channel). This expression computes a ratio of the revenue for a given channel (in a given country) to the global revenue in this country (for all channels). The result for US and Direct may be something like 85.7%. The user wants to understand how this number was obtained.

Figure 11:
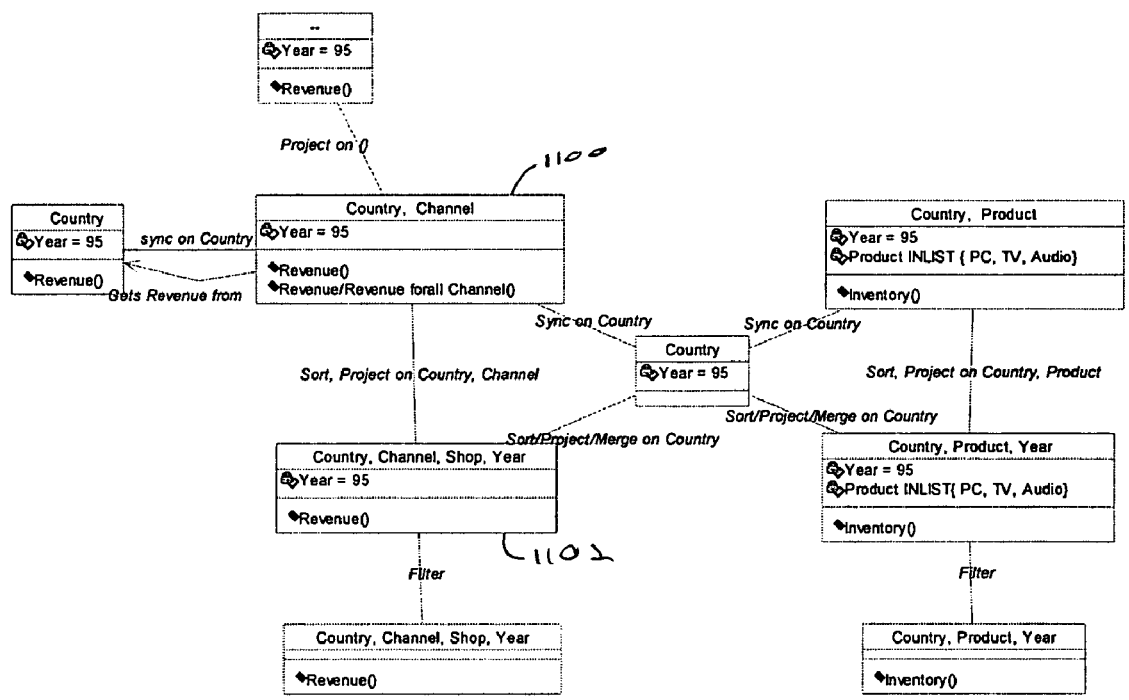
FIG. 11 illustrates a computation plan for a report with a complex formula that is processed in accordance with an embodiment of the invention.

Using the principles defined above, it is easy to help the user navigate the constituents of this value. First, the computation plan for this report would now take the form of the plan shown in FIG. 11. One can observe that it is possible to navigate from the context where the ratio is computed to the "depended" context where each of its components is being computed—one being the same final computation context and one being the additional computation context that computes revenue over Country. Because the system also knows which scalar operator is being applied to both component expressions, it may easily intercept the partial values computed from each depended context before this operator is applied, and display them. If the user has selected a specific report value for the ratio, its report value identifier is used as above, to evaluate the context for the index value corresponding to this RVI. As a result, we obtain a decomposed form of the ratio: 85.7%=257/300. Moreover, it is then possible to let the user select either of these numbers and to select the relevant formula and depended context accordingly. Then, the user can recursively obtain all the information on this partial value as provided by the invention.

For instance, the user might select the value "300" and obtain the explanation that this is the overall sales revenue for the US for Year 95. He could also review the detailed data for this sub-expression. He might perform a similar analysis for the first sub-expression. It is also possible, using the same principles as explained above, to highlight in the report not only those dimensions used as a parameter to compute the ratio (US and Channel in this case) but also the measure values that are part of this computation, if they otherwise appear in the report. For instance, one could highlight the value 257 that appears in the table close to the ratio. This can be performed by applying a slightly different version of the predicate mentioned above. A cell is highlighted if its computation context is a descendant of the selected report value's context, if both report value identifiers match on their common dimensions and if the cell's formula is exactly a report variable that was used as a component of the complex expression.

Another aspect of the inventions pertains to the ability to present to the user the entire set of data acquired from the data sources that were used to compute a report value. This allows customers to track any perceived inconsistency or surprising result down to the level of the individual row returned by the data source. Moreover, if data lineage capabilities are made available by the Extraction, Transform and Load (ETL) tool that populates the data source itself—usually a data warehouse or data mart—this feature allows users to track data down to it ultimate source. This is a key enabler for users trusting and fully understanding the data in their reports.

The way to achieve this is very similar to the other features of the invention. In this case again, a report viewer selects a report value V that is uniquely identified by a Report Value Identifier. This allows the system to select a final computation context C and a unique index value for this context. C is the common descendant of a number of computation contexts and ultimately of some of the initial contexts that deliver data acquired from the report's data source(s). Moreover, because the policy for building the computation plans involves filtering the data set first and then aggregating it, there exists a set of contexts $C_1 \ldots C_n$ such that:

Any initial node that is an ancestor of C is also an ancestor of a $C_i$, or one of the Cis itself;
No filters are applied on the contexts in $\{C_i\}$ or on their descendants;
No projection is performed on the parents of contexts in $\{C_i\}$.

This means that by intercepting the rows computed by all contexts in $\{C_i\}$, we get all the un-projected but filtered rows of data source data that are used in the computation of C. If we request a single value from C using the index value extracted from V's report value identifier, each context in $\{C_i\}$ iterates a number of rows that have been filtered out of the raw data source data and were used to compute V.

When the selected report value is a simple measure, $\{C_i\}$ is reduced to one single context, because only one flow coming from a data source normally retrieves a measure. If a more complex formula is involved, then $\{C_i\}$ may contain several elements, even if we anticipate that in practice the user would not directly look at the raw data involved in the computation of a formula, but rather recursively analyzes each of its components. In any event, the invention makes it possible to display each individual row coming from a data source that contributed to the computation of an individual value. In the case of the sample report, assuming that the user selected the value "257" for Revenue in the first table under the section for US, then the report value's context C is the one that retrieves revenue per Country and Channel (block 1100 in FIG. 11). There's only one context C0 that obeys the conditions stated above. This context computes Revenue for Country, Channel, Shop and Year for Year 95, and is depicted in block 1102 of FIG. 11.

Using the report value identifier, the system requires data from C, with an index value that specifies the first channel for the second country. The set of rows yielded by C0 during this computation is exactly the set of rows used to compute the direct revenue for the US. This row-set can then be presented to the user for detailed inspection.

The principles exposed above also make it easy to understand the cause of errors. Various errors can appear in reports, but they can be understood by looking at the underlying data. One typical type of error is a numerical error. The user may be facing something like a #DIV0 error in a cell. The formula for this cell could be a ratio as above. By analyzing the value as described above, the user will be presented with: #DIV0=257/EMPTY and can further investigate why no value was retrieved for the rightmost component of the formula. This gives a convenient way of focusing on the source of the error.

Another common source of errors in reports is when the user expects a value to be dependent on another, but in reality it is not. For instance, a metadata layer may present two objects "Age" and "Age group" dedicated to demographic studies on a customer database. "Age" depicts the age of a customer, while "Age group" is a categorization of ages in coarser categories such as "Young", "Mature", and "Senior". Now imagine that the poorly designed metadata layer erroneously declares that object "Age" is a detail from "age group", itself qualified as a dimension. This is actually a bug. "Age group" should be defined as a detail or attribute of a dimension "Age". When dimensions are organized in hierarchies, similar bugs may happen.

When a report is built on top of this metadata layer, the user is given the right to create a section on the dimension Age Group and to create a cell with "Age" in this section. The user's misled expectation is that one single value for Age can be associated to each value for Age group. Much to his surprise, when he runs the report, an error #multivalue is displayed instead of the expected unique value.

If the user does not know the structure of the underlying metadata, such a problem may be tricky to identify. Now, the invention's features allow the user to select the error value and analyze it. By retrieving the raw data that led to this evaluation, the user will realize that multiple ages, all of the same age group, have been used and collectively resulted in this error value. This helps one understand that not the report itself, but the underlying metadata layer, is faulty.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium with executable instructions to analyze a report value, comprising executable instructions to:
    select a report value;
    identify at least one formula evaluated to produce the report value;
    determine parameters associated with the at least one formula using a computation context of a plurality of computation contexts that are a part of a computation plan, each computation context comprising a set of corresponding formulas, a corresponding index with an ordered list of dimensions with sort information for each dimension, and a corresponding filtering expression, at least one of the computation contexts being synchronized to another computation context;
    locate, using the computation plan, actual parameters used to compute the report value; and
    display the actual parameters.

2. The computer readable medium of claim 1 wherein the executable instructions to determine parameters include executable instructions to process metadata characterizing the computation context.

3. The computer readable medium of claim 1 wherein the executable instructions to display include executable instructions to highlight values that match the actual parameters.

4. The computer readable medium of claim 1 wherein the analyzing of the report value allows a user to determine whether the report value is erroneous.

5. A computer readable medium with executable instructions to analyze a report value, comprising executable instructions to:
    select a report value;
    determine dimensions used to establish the report value by identifying each dimension that appears in at least one final computation node of a computation plan, the computation plan comprising of a plurality of synchronized computation contexts, each computation context comprising a set of corresponding formulas, a corresponding index with an ordered list of dimensions with sort information for each dimension, and a corresponding filtering expression; and
    display the dimensions.

6. The computer readable medium of claim 5 further comprising executable instructions to identify original data source data used to compute the report value.

7. The computer readable medium of claim 5 wherein the executable instructions to determine dimensions include executable instructions to process metadata with dimension information.

8. The computer readable medium of claim 5 further comprising executable instructions to locate a filter used to compute the report value.

9. A computer readable medium with executable instructions to analyze a report value, comprising executable instructions to:
    select a report value;
    identify a formula evaluated to produce the report value;
    determine an intermediate value for a sub-expression of the formula through a recursive call that determines parameters for the sub-expression;
    determine an intermediate value for a sub-expression of the formula through a recursive call that determines parameters for the sub-expression, where the formula for computing of the report value is a complex formula involving different synchronized computation contexts of a computation plan, each computation context comprises a set of a corresponding formula, a corresponding index with an ordered list of dimensions with sort information for each dimension, and a corresponding filtering expression;
    highlighting the intermediate value and measured values that are part of a corresponding computation in a report to users;
    presenting to users an entire set of data acquired from data sources used to compute the report value; and
    identifying inconsistent results based on the set of data presented to users.

10. The computer readable medium of claim 9 further comprising executable instructions to display the intermediate value with an operator from the formula.

11. The computer readable medium of claim 9 wherein the executable instructions to select a report value include executable instructions to select an error value.

12. The computer readable medium of claim 9 further comprising executable instructions to locate a filter used to compute the report value.

* * * * *